United States Patent [19]
Levine et al.

[11] 4,366,922
[45] Jan. 4, 1983

[54] BOTTLE AND HOLDER ASSEMBLY

[75] Inventors: Edward H. Levine, Providence; F. E. Dixon Newbold, Newport, both of, RI

[73] Assignee: Rhode Gear U.S.A., Providence, R.I.

[21] Appl. No.: 261,682

[22] Filed: May 7, 1981

[51] Int. Cl.³ .............................................. B62J 11/00
[52] U.S. Cl. ............................... 224/32 R; 248/221.3; 248/224.2
[58] Field of Search ................ 224/30 R, 30 A, 32 R, 224/39; 248/224.2, 223.4, 225.1, 316 D, 316 E, 221.3

[56] References Cited

U.S. PATENT DOCUMENTS

| 1,788,464 | 1/1931 | Kederis et al. | 248/224.2 X |
| 4,009,810 | 3/1977 | Shook | 224/32 R |
| 4,095,812 | 6/1978 | Rowe | 224/32 R |

FOREIGN PATENT DOCUMENTS

| 618040 | 3/1927 | France | 224/30 R |
| 619815 | 4/1927 | France | 224/30 R |
| 454772 | 2/1950 | Italy | 224/30 R |

Primary Examiner—Steven M. Pollard
Assistant Examiner—D. Voorhees
Attorney, Agent, or Firm—Wolf, Greenfield & Sacks

[57] ABSTRACT

A water bottle and holder assembly for use on a bicycle comprising a water bottle having a ribbed keystone shaped tongue. A holder having a complementary slot for receiving the tongue and a clamp for attaching the holder is secured to a bicycle frame. A bolt that secures the holder for the frame also engaging the ribs to securely hold the bottle in the holder. Finger grips integrally formed in the bottle on either side of the tongue are shaped and sized to permit simple withdrawal of the bottle from the holder by a cyclist.

6 Claims, 8 Drawing Figures

4,366,922

BOTTLE AND HOLDER ASSEMBLY

BACKGROUND OF THE INVENTION

There has been a need for better designed water bottles and means for attaching them to bicycles in such a manner that the bottles will not be jarred loose accidently but can easily be removed by the bicyclist when riding. Some devices presently in use provide clamps or straps which hold the bottle to the bicycle frame. In other arrangements, a bottle is placed in a wire carrier or basket which in turn is clamped to the bicycle. Neither of these devices are satisfactory since in one it is difficult to remove the bottle and the other does not hold the bottle firmly enough to prevent jarring and accidental displacement. None of these or other known devices provide a completely satisfactory system from either a functional or aesthetic viewpoint.

SUMMARY OF THE INVENTION

The present invention comprises a plastic clamp or holder adapted to be clamped to a vertical frame bar of a bicycle. The holder forms a vertical keystone slot which is wide at the top and narrow at the bottom and which is formed with a dovetail shaped cross section. The holder also forms a clamp that engages a bicycle bar. A longitudinal bolt extends through legs of the clamp and partially protrudes into the vertical slot. The bottle is preferably plastic and has an integral vertical keystone shaped tongue which is wide at the top and narrows continuously towards the bottom. The tongue engages the complementary slot in the holder with ribs formed on the tongue adapted to engage the bolt. An object of the present invention is to provide a bicycle water bottle and holder assembly in which a water bottle may be easily reached and removed or inserted by a cyclist while riding the bicycle.

Another object of the present invention is to provide a water bottle carrier assembly providing an improved grip configuration integrally molded in the bottle.

Another object of the present invention is to provide an improved holder or carrier assembly for a bicycle water bottle in which the holder is designed with a clamp element that both secures the holder to the bicycle frame and also a keystone slot to receive and secure the bottle.

Another object of the present invention is to provide a water bottle and carrier in which the weight of the bottle and its contents is utilized to further hold the bottle to the carrier.

Still another object of the present invention is to provide a water bottle and carrier which interact in a self-locking fashion.

Another object of the present invention is to provide a water bottle and carrier in which the complementary shape of the interacting elements are self-centering. This allows a cyclist to insert the bottle into the holder with one hand without looking down.

Yet another object of the present invention is to provide an aesthetically pleasing water bottle carrier assembly in which the parts are simple, inexpensive and easy to manufacture, assemble, and install.

DESCRIPTION OF THE DRAWINGS

The foregoing objects and advantages of the present invention will be more clearly understood when considered in conjunction with the accompanying drawings in which.

DESCRIPTION OF THE INVENTION

The carrier and bottle of the present invention may be mounted on any portion of the bicycle frame. However, for purposes of illustration, it is shown mounted on a rear vertical member of the bicycle frame. The mounting of the device is a matter of convenience and personal preferance.

Figure 1:
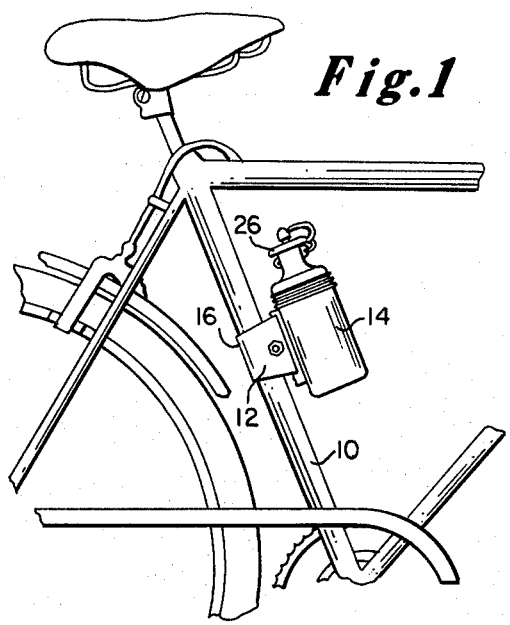
FIG. 1 is a side elevation of a portion of a bicycle showing the bottle and carrier assembly of the present invention.
Figure 2:
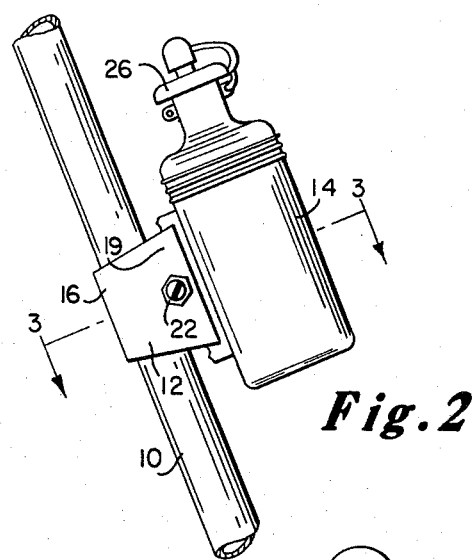
FIG. 2 is an enlarged side elevation of the bottle and holder as shown in FIG. 1.

Referring now to FIGS. 1 and 2, a bicycle frame member 10 is provided with a holder or clamp 12 which is clamped to member 10, and on which a water bottle 14 is mounted. The holder 12 comprises an elongated single piece of flexible plastic having a band 16 forming a bight best shown in FIG. 3 and adapted to encircle frame member 10. The ends of the clamp comprise legs 18 and 19 shaped as enlarged portions that extend from band 16. These enlarged portions 18, 19 extend forwardly as viewed in FIG. 1. The opening formed between portions 18 and 19 has, in its horizontal cross section a generally dovetail like cross section. This cross section is formed by arranging the vertically extending inner surfaces of portions 18 and 19 farther apart at their inner edges nearer bight 16 than the outer edges. Further, the upper ends of portions 18 and 19 as viewed in FIG. 2 are farther apart than the lower ends, thus forming a keystone taper in the slot 20 that is larger at the top than the bottom.

A tightening bolt 22 extends horizontally through aligned openings in legs 18 and 19 about halfway between their ends. A nut 24 engages bolt 22 to secure the holder 12 on member 10. The bolt 22 extends into and across the slot 20.

Figure 4:
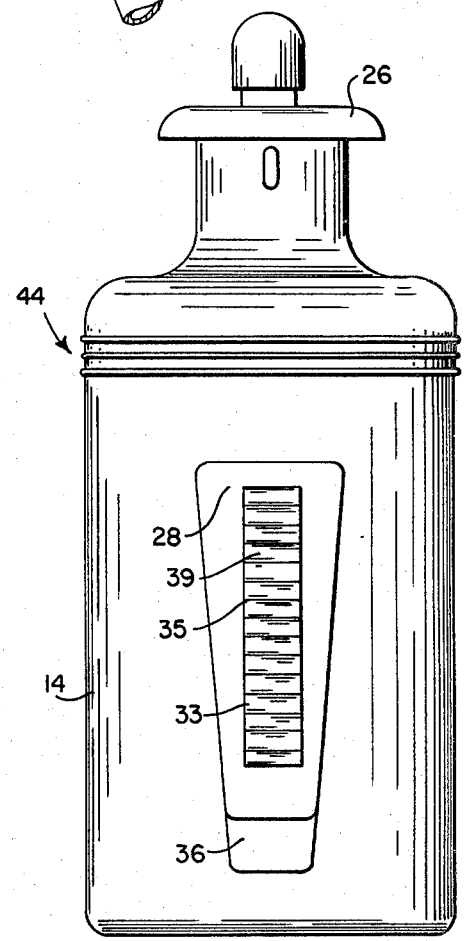
FIG. 4 is an enlarged rear elevation of one embodiment of the bottle.
Figure 7:
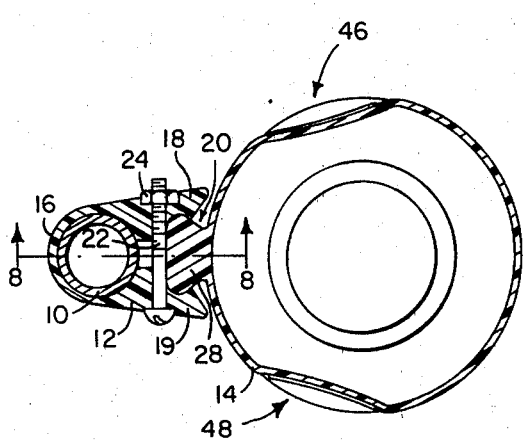
FIG. 7 is a section taken along line 7—7 in FIG. 6.
Figure 6:
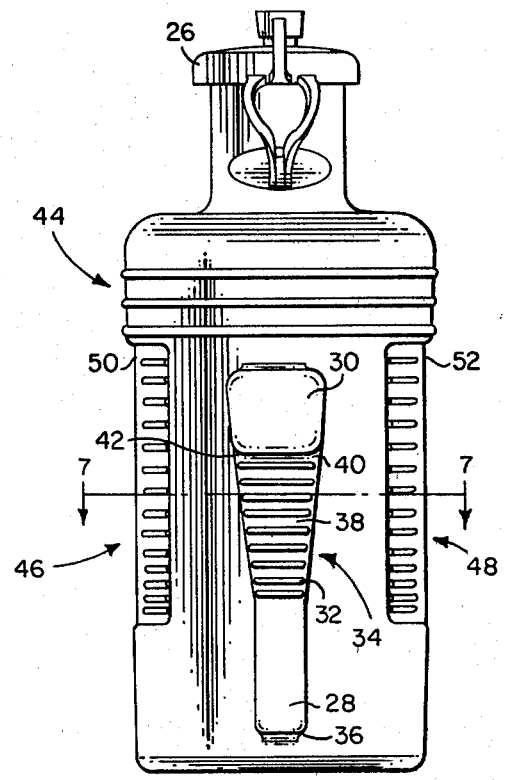
FIG. 6 is an enlarged rear elevation of preferred embodiment of bottle.
Figure 8:
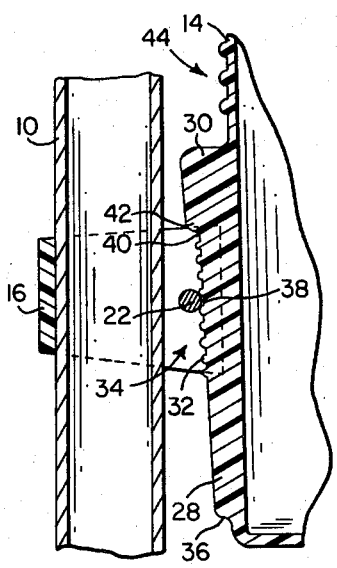
FIG. 8 is a section taken along line 8—8 in FIG. 7.

The bottle 14 is conventionally molded of a plastic material and provided with a conventional stopper arrangement 26 as shown in FIGS. 4 and 6. In the preferred embodiment shown in FIGS. 6 to 8, the bottle is molded with an integrally formed protruding vertical elongated keystone shaped tongue 28 having a protruding top or ledge 30 and a center section with a plurality of horizontal ribs 32 forming a serrated-like surface 34 and a lower tail-like end 36. The tongue 28 is shaped and sized to snugly fit within slot 20 of holder 12 as shown in FIG. 7. When the bottle 14 is secured in the holder 12 the lower end 36 of tongue 28 has self-centered the bottle in the slot 20. The horizontal bolt 22 is frictionally engaged in one of gaps 38 formed between ribs 32 which tightly holds bottle 14 in the holder 12. The frictional engagement is firm while still allowing removal of the bottle by a relatively easy upward pull.

Since the size of slot 20 will vary with the diameter of member 10, bottle 14 will not necessarily be located in the same position relative to holder 12 when the unit is secured to different bicycles. The function, therefore, of protrusion or ledge 30 is to prevent the tongue 28 from being pushed too far into holder 12 as to make it difficult to remove. This protrusion or ledge 30 is sufficiently large to normally engage the upper end of holder 12 in the opening 20 irrespective of the particular size that opening 20 has when attached to a wide range of bicycle frame sizes. When the ledge 30 functions to prevent the bottle from being pushed into the holder 12, the ledge 30 cooperates with the next adjacent rib to secure the bottle with the bolt 38 engaged in the serration or channel 40 formed between the ledge 30 and the adjacent rib.

A plurality of annular ribs 44, preferably 3 in number, are integrally formed at the upper cylindrical portion of the bottle just below the neck. These ribs form means that facilitate gripping the bottle from above. In addition, a pair of symetrically arranged depressions 46 and 48 are integrally formed on either side of the tongue 28. These depressions extend parallel to the longitudinal axis of the bottle 14 for a major portion of its length from the bottom to the next portion. These depressions are integrally formed in the side wall of the bottle 14 and, as best illustrated in FIG. 7, are formed closer to the tongue 28 than to the portion of the bottle diametrically opposite the tongue. Each of these depressions are formed with a plurality of parallel ribs 50 and 52 which are normal to the longitudinal axis of the bottle. The depressions 46 and 48 are oriented so that a cyclist may grasp the bottle with thumb and forefingers respectively in opposite depressions.

Figure 3:
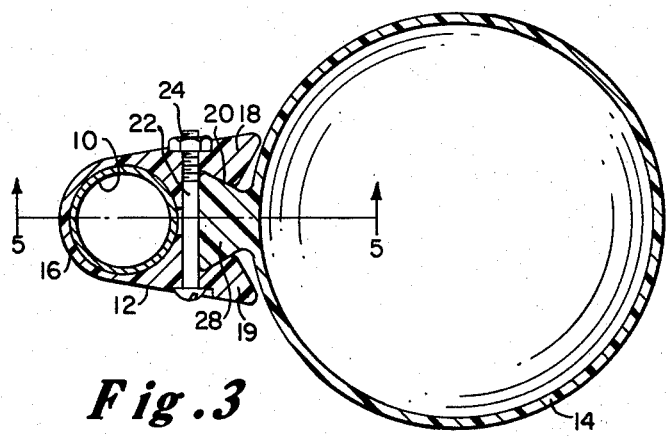
FIG. 3 is an enlarged section taken along line 3—3 in FIG. 2.
Figure 5:
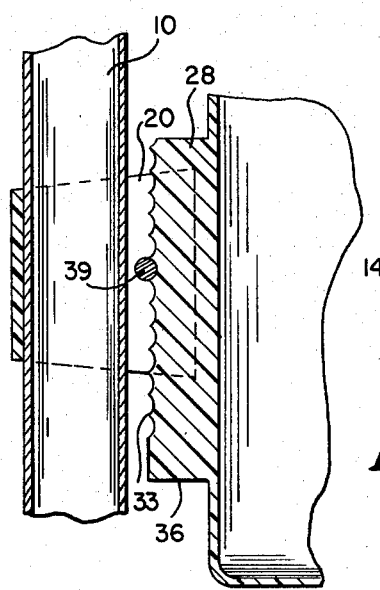
FIG. 5 is a section taken along line 5—5 in FIG. 3.

Another embodiment of the present invention is shown in FIGS. 3 through 5 inclusive. In this embodiment, like numbers illustrate components similar to those described in the embodiment of FIGS. 6 through 8. A principal difference between the preferred embodiment and that shown in FIGS. 3 to 5 relates to the configuration of tongue 28. In this embodiment, tongue 28 is not provided with protrusion or ledge 30. A vertical segment 33 on the outer vertical face of the tongue 28 is formed with a corrugated or serrated surface 35 which extends nearly the entire length of the tongue 28. Channels 39 formed in this surface 33 are designed to engage the bolt 22 in a manner similar to the ribs of the preferred embodiment.

When the bottle is filled with fluid, the weight of the bottle and content function to assist in securing the bottle 14 in the holder 12.

If desired, bolt 22 may be covered with a plastic sleeve to enlarge the diameter of the bolt 22 thereby providing additional service for engagement between the ribs 32 and further providing means for minimizing wear on these ribs.

What we claim and desire to secure by Letters Patent of the United States is:

1. A container and holder assembly for attachment to the frame of a cycle comprising:
   an integrally formed plastic container having an elongated body with an integrally formed tongue projecting from the sidewall of the container body and extending longitudinally of the longitudinal axis of the container;
   a plurality of ribs formed on the surface of said tongue and extending normal to the longitudinal axis of said container body;
   said holder comprising a U-shaped clamp having a segment adjacent the bight of the U that is adapted to engage a tubular member of said cycle, said U-shaped clamp including a pair of legs extending from the bight;
   means for spanning the space between said legs at a distance sufficient from said bight to permit said tubular member to be positioned within said bight, said means for spanning said legs adapted to secure said holder to said tubular member and to provide means for engaging said ribs.

2. A container as set forth in claim 1 wherein said means for spanning said legs comprises a bolt secured at opposite ends to said pair of legs and having a cylindrical surface adapted to engage said ribs when said container is positioned in said holder.

3. A container and holder assembly as set forth in claim 2 wherein said pair of legs are shaped to form a keystone slot and said tongue is shaped into a keystone configuration complementary with said keystone slot.

4. A holder and carrier as set forth in claim 3 wherein said legs have a cross-sectional configuration taken in a plane normal to the length of said clamp such as to form a slot with a dovetail cross-sectional shape and said tongue is formed with a complementary dovetail cross-sectional shape.

5. A holder and carrier as set forth in claim 4 wherein said tongue is formed with a protruding upper portion adapted to engage said slot formed by said legs to limit downward movement of said tongue into said slot.

6. A container and holder as set forth in claim 1 wherein said container is shaped with a pair of elongated depressions extending longitudinally on the axis of said container in symetrical arrangement with respect to said tongue, said depressions being formed with a plurality of finger gripping ribs that extend parallel to one another and are normal to the longitudinal axis of said container.

* * * * *